(12) United States Patent
Martin et al.

(10) Patent No.: US 7,761,345 B1
(45) Date of Patent: Jul. 20, 2010

(54) DECISION AID

(75) Inventors: Sean Christopher Martin, Cambridge (GB); David William Nathaniel Sharp, London (GB)

(73) Assignee: Socrates Holding GmbH, Salzburg (AT)

( * ) Notice: Subject to any disclaimer, the term of this patent is extended or adjusted under 35 U.S.C. 154(b) by 0 days.

(21) Appl. No.: 09/673,790

(22) PCT Filed: Apr. 21, 1999

(86) PCT No.: PCT/GB99/01031

§ 371 (c)(1),
(2), (4) Date: Mar. 13, 2001

(87) PCT Pub. No.: WO99/54836

PCT Pub. Date: Oct. 28, 1999

(30) Foreign Application Priority Data

Apr. 21, 1998 (EP) .................................. 98303046

(51) Int. Cl.
*G06Q 40/00* (2006.01)

(52) U.S. Cl. .......................................... 705/27; 705/28

(58) Field of Classification Search .................. 705/26, 705/27–28, 7–8, 36
See application file for complete search history.

(56) References Cited

U.S. PATENT DOCUMENTS

| | | | | |
|---|---|---|---|---|
| 5,270,919 A | * | 12/1993 | Blake et al. .................. | 370/400 |
| 5,717,865 A | | 2/1998 | Stratmann | |
| 5,745,681 A | * | 4/1998 | Levine et al. ............... | 709/200 |
| 5,852,560 A | * | 12/1998 | Takeyama et al. ............. | 700/97 |
| 5,918,217 A | * | 6/1999 | Maggioncalda et al. ... | 705/36 R |
| 5,963,910 A | * | 10/1999 | Ulwick ........................... | 705/7 |
| 6,108,635 A | * | 8/2000 | Herren et al. ................... | 705/2 |
| 6,131,086 A | * | 10/2000 | Walker et al. .................. | 705/26 |
| 6,144,943 A | * | 11/2000 | Minder ........................ | 705/11 |
| 6,260,024 B1 | * | 7/2001 | Shkedy ......................... | 705/37 |
| 6,609,108 B1 | * | 8/2003 | Pulliam et al. ................ | 705/27 |
| 6,625,581 B1 | * | 9/2003 | Perkowski .................... | 705/27 |

(Continued)

FOREIGN PATENT DOCUMENTS

WO      WO 9529452      11/1995

(Continued)

OTHER PUBLICATIONS

Ahlberg C., et al., "Dynamic Queries for Information Exploration: An Implementation and Evaluation" Striking A Balance, Monterey, May 3-7, 1992, May 3, 1992, pp. 619-626, XP000426842, Bauersfeld P; Bennett J; Lynch G; p. 620, col. 1, line 6—col. 2, line 20, figures 1, 2.

(Continued)

*Primary Examiner*—Thu Thao Havan
(74) *Attorney, Agent, or Firm*—Baker Botts LLP

(57) ABSTRACT

An information sorting decision aid which aids a decision-maker through the second stage of decision-making of choosing from a large variety of similar products through the use of a graphical preference mechanism together with locally executed recommendation and display logic. A novel combination of a user interface comprising several sliders with Rackham's hypothesis and with a novel weighted matching algorithm to rank products is presented. Each product or service is given a score based on how well its feature strengths match the needs of a user of a system of the invention as expressed by the positions of the sliders.

9 Claims, 3 Drawing Sheets

U.S. PATENT DOCUMENTS

| | | | |
|---|---|---|---|
| 6,654,726 B1 * | 11/2003 | Hanzek | 705/26 |
| 6,728,685 B1 * | 4/2004 | Ahluwalia | 705/26 |
| 6,811,344 B1 * | 11/2004 | Kobayashi et al. | 403/2 |
| 6,900,807 B1 * | 5/2005 | Liongosari et al. | 345/440 |
| 6,922,816 B1 * | 7/2005 | Amin et al. | 715/833 |
| 2002/0080196 A1 * | 6/2002 | Bornstein et al. | 345/854 |
| 2002/0120469 A1 * | 8/2002 | Javitt | 705/2 |

FOREIGN PATENT DOCUMENTS

| | | |
|---|---|---|
| WO | WO 9749055 | 12/1997 |

OTHER PUBLICATIONS

Kroll J: "Finden Statt Suchen. Multimedia-Datenbank Fur Elektronische Bauteile: Der Katalog Auf CD Feiert Premiere" Elektronik, vol. 43, No. 20, Oct. 4, 1994, pp. 92-94, 96-98, XP000445340 ISSN: 0013-5658 p. 94, col. 2, line 24—p. 95, col. 1, line 10 figure 6.

\* cited by examiner

DECISION AID

FIELD OF THE INVENTION

The present invention relates to technical implementations of methods of aiding decisions when deciding between a plurality of similar products, services or control strategies, in particular to such implementations which use weightings of a number of relevant factors. In particular, the present invention relates to a decision aid for a user engaged in a selection activity using an interaction device connected to the Internet or another communications network.

BACKGROUND ART

Consider a situation where a potential customer is faced with selecting the most appropriate product or service from a selection that is great in number.

It can appear to the customer that the products or services are quite similar and their differences are not that apparent, and further, the decision-making process is complicated by the extent of the selection. A customer may typically lack the confidence that any particular product or service is a good match with their needs, and in consequence such a customer will often not reach a decision to purchase even though very suitable products are offered.

There is therefore a need for a decision aid that assists a customer in purchasing decisions. Such a decision can produce a short list of products or services which are a good match with the customer's needs together with justification or explanation relating to the selection in the short list. Such a short list can allow the customer to make the easier final choice from say twenty products or services that appear to the user only to be generally suitable.

'Decision Guide'—a software package that allows users to slide sliders one at a time in order to state how important various features of a holiday are is known in the art. This package treats features uniformly in identifying holidays which match the set of criteria that are important to the user.

Rackham's book on 'Making Major Sales' lays out the theory that consumers' behaviour can be modelled by:
- identifying a set of criteria that the consumer considers important in evaluating a product or service;
- ranking the importance of these selection criteria to the customer;
- identifying leading 'best match' products and services according to a principle based on the match with criteria ranked highly by the consumer in preference to the match with those criteria ranked lowly by the consumer.

However, Rackham does not indicate a mechanism for implementing his theory.

Present systems do not allow decision makers to non-linearly weight their decision criteria in order to arrive at an optimum ranking of products/services.

One accepted account of an overall purchase-decision-making process for a person engaged in the activity of selecting a product or service (hereafter, for simplicity, referred to simply as a product) suggests that there are three individual decision-making steps. The first step concerns the person recognising the need for a product leading to a decision that the person 'wants one of these products'. The second step concerns the person evaluating the options leading to a decision that the person 'wants a particular product'. The third step concerns the person overcoming doubts that may arise leading to a decision to proceed with and conclude the selection/purchase activity.

The limitations of many current techniques of aiding a decision maker are evident when they are compared with this three-step account of the decision-making processes.

For example, many electronic commerce web sites make good use of graphics and multimedia to engage the user in the desirability of having one of the products being offered, thus helping the user through the first decision-making step. Also, many web sites provide reassurance about the final selection/purchase activity such as the security of financial transactions, the return of products, support and warranty, thus helping the user through the third decision-making step. Such web sites thus adequately aid a user with the first and third steps, but do not provide aid for the second step.

Many web sites simply present information, and sometimes a considerable amount of information, describing each available product. This is done, presumably, with the expectation that a simple presentation of information about the products on offer will form a sufficient basis for the user to be able to evaluate the options and thus carry through the second step of the decision process. In practice this is not an effective technique and users of such web-sites often do not choose an option (i.e. stay at the first step of the decision-making process) or spontaneously make an ill-informed decision (i.e. miss out the second step of the decision-making process altogether because of information overload).

This conclusion is reached by considering a typical situation in electronic commerce. A good retailer is generally considered to be one that offers a wide choice to the consumer. The choice offered in a conventional (non-electronic-based) retail environment often comprises a wide range of between ten and thirty or more similar products. A typical retail environment (i.e. a shop) is designed to make the decision process engaging and interesting so that consumers obtain satisfaction from the decision and selection process. However, when using a typical electronic interaction device, such as a personal computer connected to the Internet, it is very difficult (and often uninteresting) for a user to make a selection by browsing detailed large amounts of information about a lengthy succession of individual similar products.

It is generally possible for a user to make a detailed assessment of selection options from only a very limited range, perhaps as few as three similar products when using such an interaction device. The user's selection process is significantly impaired if there are more than about five similar products, if no assistance is provided for comparing information about the products. This is because it is generally difficult to compare information and so the comparison process becomes a repetitive mental chore that quickly leads to boredom, which in turn leads to distraction thus making it easy for the consumer not to complete the decision-making activity.

The second decision-making step is thus a weak link in the chain of decision-making processes. However, attempts have been made to provide assistance with this decision-making process.

A first example of such an attempt to provide decision-making assistance concerns the presentation of a summary display comprising a synopsis of the many products that are available. A user can select one of these products and request more detailed information regarding that product—held on a separate web page on a remote server. After examining that information the user returns to the summary page and considers an alternative product. This technique is referred to colloquially as a 'pogo-stick' since it involves the user jumping up and down between a sequence of web pages. It is difficult for the user to compare products because detailed information is shown about only one product at one time and navigation through the information is inhibited by the delays that occur when accessing information from a remote server.

A second example of such an attempt to provide decision-making assistance provides a user with a form with several fields or pull-down menus that are used by the user to convey preference information. The content of such a form is transmitted via the Internet and processed by a remote server. Recommendation logic executes on the remote server and recommendations are then transmitted back to the user. The delay between submitting a completed form and receiving recommendations can often amount to many seconds which is significantly greater than a human user's typical sub-second response time. Such delays induce boredom and allow the user to become distracted. Users might thus typically engage in only two or three alternative queries before being frustrated by the slow response and thus not conclude the decision-making process.

A third example of such an attempt to provide decision-making assistance concerns the improved use of sliders to indicate user preference information instead of making entries in fields in a form or by using pull-down menus. In this example the preference information is transmitted to recommendation logic executing on a remote server, as in the second example thus still leading to a slow response, and the user thus being unwilling to engage in exploring many alternatives.

SUMMARY OF THE INVENTION

The invention provides an information sorting system for use in ranking a plurality of products/services according to the apparent desirability of each product/service to a system user which comprises a memory means which stores information on the plurality of services/products in the form of scores relating to a number of predetermined features of the products/services, a user interface which allows a user to indicate how important each of the number of predetermined features are to them calculating means for calculating a score for each product/service according to the following formula:

$$S_p = f(s_{i,p}, I_i); i \in \{1 \ldots N\}; p \in \{1 \ldots Q\}$$

wherein $S_p$ represents the overall score for a particular product p $f(\ldots)$ represents 'some function of'

$s_{i,p}$ represents the individual score for feature i of product p (in the range from $s_{min}$ to $s_{max}$)

$I_i$ represents the importance of feature i to the user

N represents the number of predetermined features

Q represents the number of products/services

In another aspect, the present invention provides a technically-implemented decision aid method for aiding the decision-making process of a user for use in conjunction with an interaction device, which is connected to an information network, such as the internet, and a display means of which interaction device displays graphical preference mechanisms for entering, adjusting and displaying preference information and a synopsis of recommended products, wherein the method involves the following steps:

Product data from a remote server is delivered to the interaction device, which product data contains information concerning products, relevant preference criteria such products, an evaluation of such products with regard to the preference criteria and instructions to the interaction device on how to configure the display means of the interaction device;

The user is enabled to enter or adjust preference information using the graphical preference mechanisms;

Within the interaction device, recommendation logic executes so that a recommendation of leading products is made substantially immediately following the user entering or adjusting preference information using the graphical preference mechanisms;

Within the interaction device, display logic executes so that at least some elements of a synopsis of new recommendations are updated on the display substantially immediately after new recommendations are made by the recommendation logic;

The user is enabled to indicate one of the recommended products using a pointing or similar selection device, such as a mouse.

In one preferred embodiment, the graphical preference mechanisms consist of graphical slider mechanisms.

In another preferred embodiment, the display means also displays detailed information about one of the recommended products.

In another preferred embodiment, the display means also displays a graphical pre-select mechanism for pre-selecting a subset of the available products from which recommendations are to be made.

The present invention has at least the following advantages over prior art decision aids:

The user may quickly explore the consequences of many different combinations of preferences while the display is updated with recommendations without apparent delay.

The simultaneous display of graphical preference mechanisms, the synopsis of recommendations (and, in one preferred embodiment, detailed information about one of the recommended products) together provide the user with a visual context for the overall decision-making process.

This visual context provides short term memory for the user thus assisting the decision-making process by reminding the user of their preferences, the recommended products (and, in one embodiment, the details concerning one of these products). This removes a mental chore that makes unaided comparison between similar products difficult. This visual context would be absent when the user sequentially has to navigate a sequence of web pages.

The present invention is unique because it provides highly interactive assistance for a user engaged in a selection task in a way that matches the psychological decision making processes of the user, and also while obtaining data about products from a remote server.

The invention provides a system which non-linearly weights various features and provides a fast, efficient manner for ranking a plurality of similar products/services.

The invention also provides a powerful means for translating a user's apparent preferences into a decision which may be used in controlling a machine based on a machine operator's preferences.

Further objectives and advantages of the invention will become apparent from a consideration of the ensuing description.

DETAILED DESCRIPTION OF THE INVENTION

Figure 1:
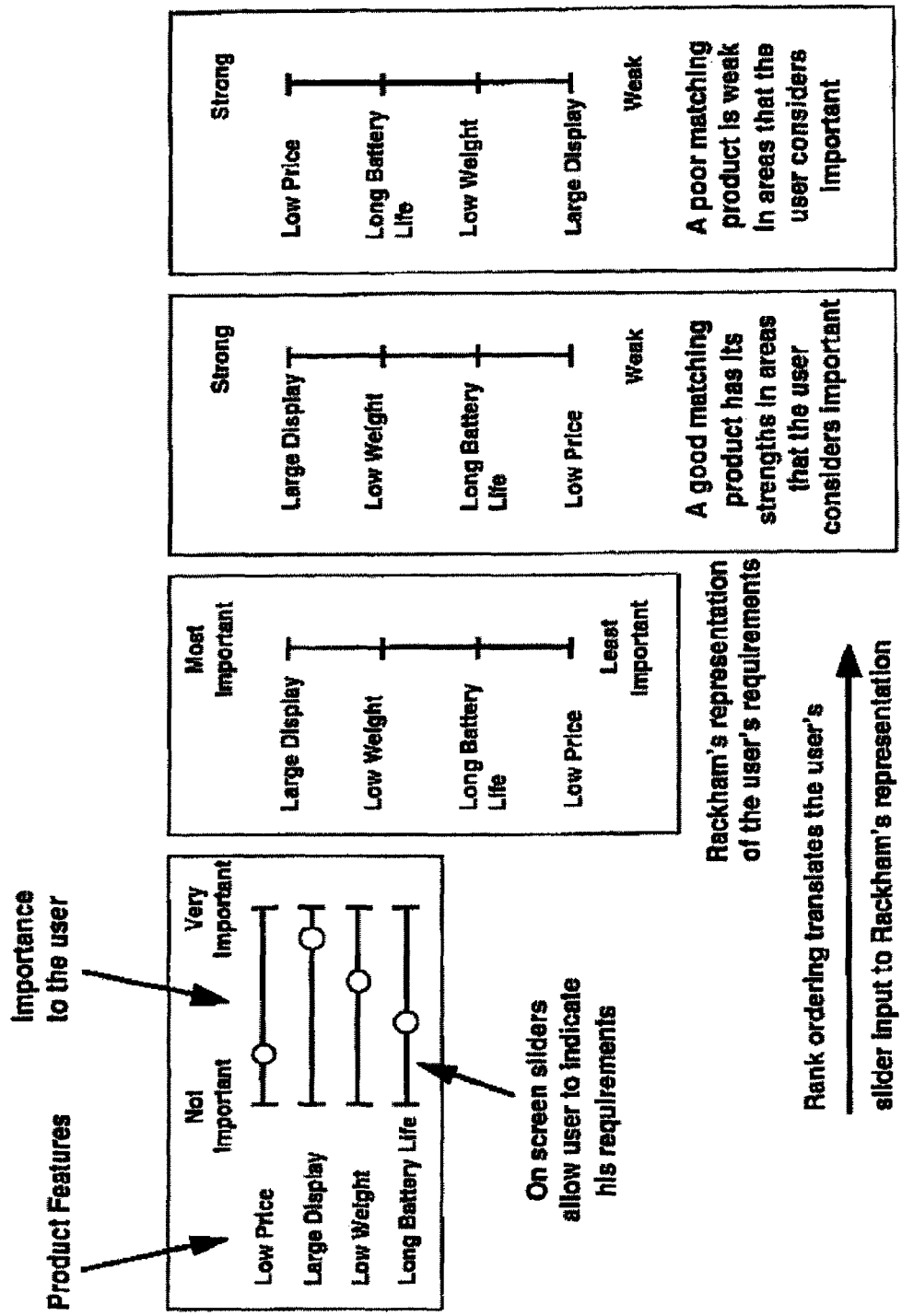
FIG. 1: A schematic diagram showing a typical embodiment according to the invention implemented for a simple scenario involving a user choosing from amongst a plurality of mobile phones.

The present invention provides a system which provides a user with a method of using Rackham's theories without having to understand them. The invention combines:

- a technique for interacting with the user that allows the user to indicate the importance of criteria for selecting a product or service, and in so doing allows the ranking of the criteria to be inferred;
- an algorithm for scoring which places a greater weight on the match of candidate products or services for criteria ranked highly by the user and which places a lesser weight on the match of candidate products or services for criteria ranked lowly by the user;
- a technique for ranking the scores of candidate products or services and displaying the leading products or services deduced to be the most appropriate for the user.

The present invention involves the novel combination of a user interface comprising several sliders with Rackham's hypothesis and with a novel weighted matching algorithm to rank products or services being chosen amongst. Each product or service is given a score based on how well its feature strengths match the needs of a user of the system of the invention as expressed by the positions of the sliders.

In general, the novel algorithm may be represented as follows:

$$S_p = f(s_{i,p}, I_i); i \in \{1 \ldots N\}; p \in \{1 \ldots Q\}$$

wherein
$S_p$ represents the overall score for product p
$f(\ldots)$ represents 'some function of'
$s_{i,p}$ represents the score for feature I of product p (in the range from $s_{min}$ to $s_{max}$)
$I_i$ represents the importance of feature I to the user
N represents the number of features
Q represents the number of products or services A simple implementable example of the general algorithm given above would be:

$$S_p = \Sigma_{i=1 \, to \, N}(s_{i,p} \times I_i)$$

The system displays a score bar indicating how well a product or service matches the user's criteria.

The score value may be normalised relative to the maximum score a perfect product or service could obtain. Using the simple example given above, this would mean:

$$\text{Length of score bar} = \frac{\sum_{i=1 \, to \, N}(s_{i,p} \times I_i)}{\sum_{i=1 \, to \, N}(s_{max} \times I_i)} = \frac{\sum_{i=1 \, to \, N}(s_{i,p} \times I_i)}{s_{max} \times \sum_{i=1 \, to \, N}(I_i)}$$

In a preferred embodiment, the scoring algorithm is adjusted to give the same subjective ranking that would be chosen by a salesperson who is an expert at selling the range of products or services. This is achieved either by tuning the scoring algorithm according to heuristics or using neural network techniques to score the product match.

When used in a control system, the information sorting system of the current invention allows the control system to make qualitative choices between the various control strategies which the control system has available to it based on a system operator's indicated preferences—without a need for the system operator to do more than indicate these preferences. No prior art information sorting system allowed such a simple operator interaction with a controlled system.

Figure 2:
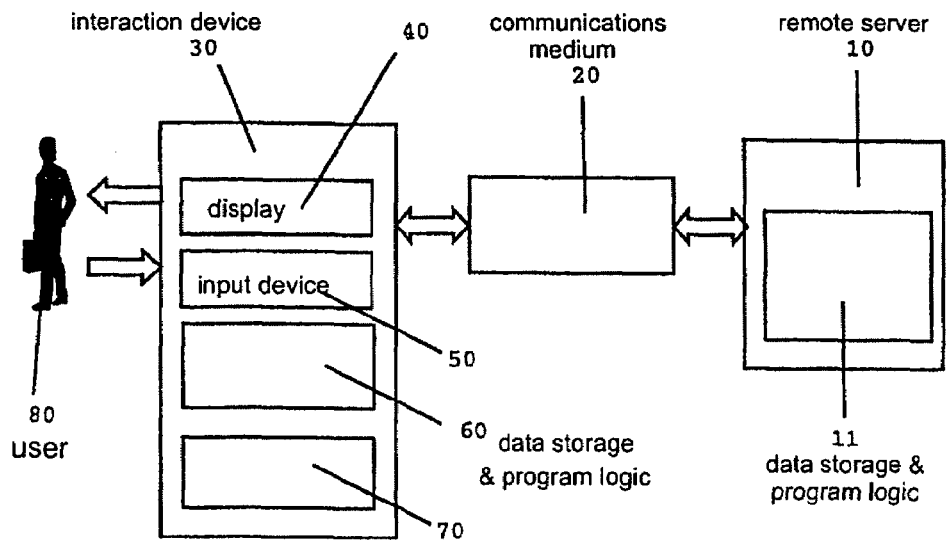
FIG. 2: A schematic block diagram describing the main system components.

Referring to FIG. 2, a remote server (10) is a computing device that holds source reference data and program logic (11) for the electronic selection aid. The communications medium (20) connects the remote server (10) to the interaction device (30). The source reference data and program logic (11) is downloaded via the communications medium (20) to the interaction device (30) where it is held as reference data and program logic (60). The interaction device (30) comprises a display (40) and an input device (50). The user (80) interacts with the interaction device (30) by means of the display (40) which convey information from the interaction device (30) to the user, and by means of the input device (50) which conveys information from the user to the interaction device.

Figure 3:
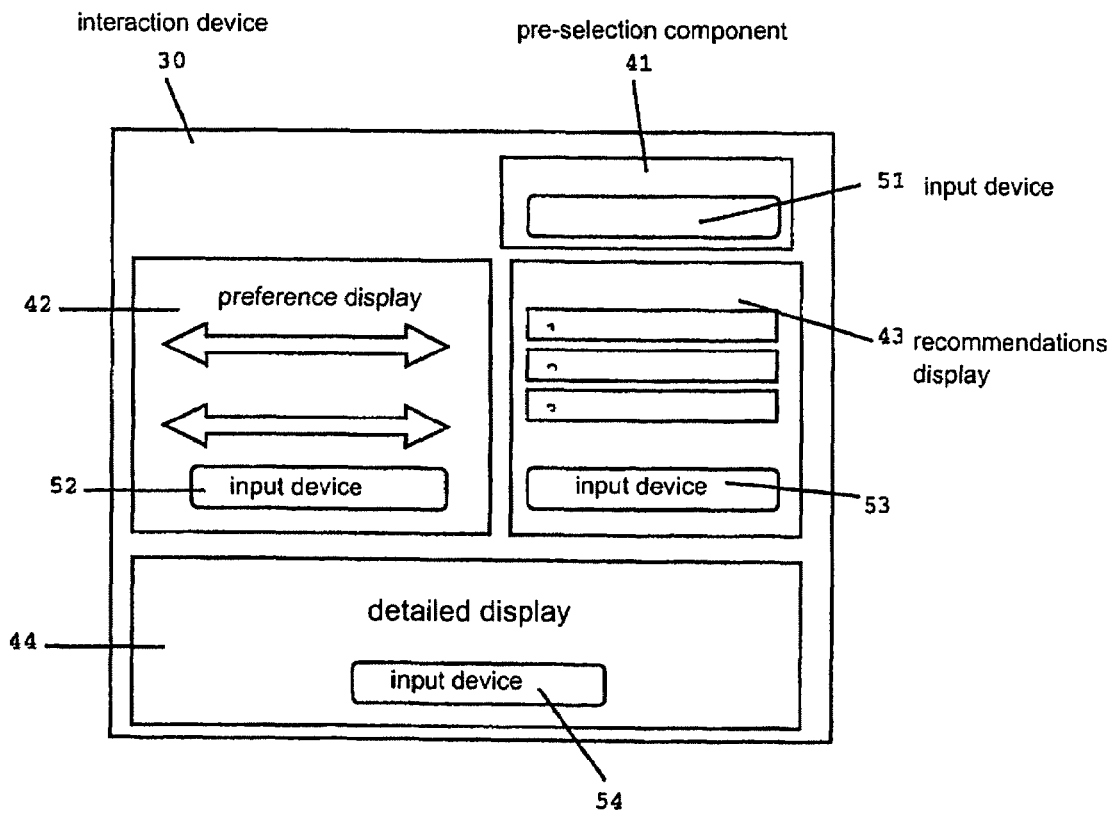
FIG. 3: A schematic block diagram describing the principal interaction components.

Referring to FIG. 3, the interaction device (30) comprises four principal components each comprising both a display and an input device, as follows:

The pre-selection component (41) and its associated input device (51) are optional, and may be used to select a subset from the total number of products available. This may include the use of radio buttons to select products with particular attributes, for example, selecting only portable products.

The preference display (42) indicates to the user the current preference settings, which are entered using the input device (52).

The recommendations display (43) indicates a synopsis of the recommendations that are a good match with the preference settings. The associated input device (53) can be used to select a particular product as being chosen or requesting more detailed information about a particular product.

The detailed display (44) presents detailed information about one of the recommended products. The associated input device (54) can be used to select a particular product as being chosen.

Figure 4:
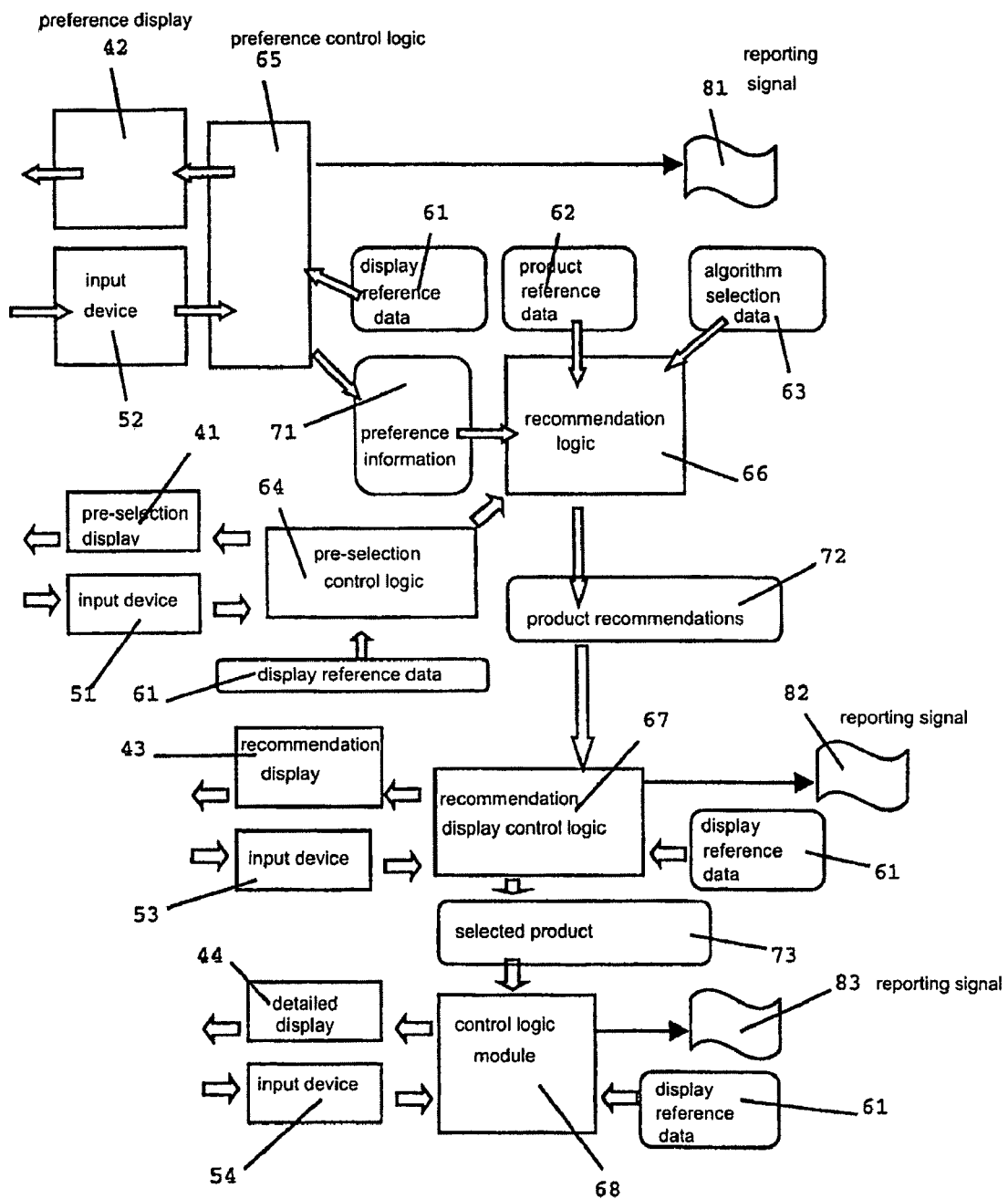
FIG. 4: A schematic block diagram describing the components of the interaction device.

Referring to FIG. 4, display reference data (61) contains information controlling the layout of the displays on the interaction device (30). Product reference data (62) contains scores for each product with respect to each preference criterion. Algorithm selection data (63) contains information controlling the behaviour of the recommendation logic (66). The group of items (61), (62) and (63) thus provide the reference data, which is part of (60), and which is used by other components of the interaction device. The remainder of (60) comprises the program logic modules: the preference control logic (65), the recommendation logic (66), the recommendation display control logic (67) and the detailed display control logic (68).

The pre-selection control logic (64) takes display reference data (61) and uses it to format the pre-selection display (41) and the associated input device (51). The pre-selection control logic indicates to the recommendation logic (66) whether recommendations are to be made from a subset of the available products.

The preference control logic (65) takes display reference data (61) and uses it to format the preference display (42). Preference control logic (65) also takes information from the associated input device (52) regarding preference information entered by the user and updates the preference display (42). It passes the preference information (71) to the recommendation logic (66).

The recommendation logic (66) uses algorithm selection data and product reference data (62) to process preference information (71) and produces product recommendations (72). Several different algorithms may be used within the recommendation logic (66) where these may be as described above or based on a least squares best match algorithm, or other matching algorithms.

Product recommendations (72) are passed to the recommendation display control logic (67). Recommendation display control logic (67) uses display reference data (61) to format the recommendation display (43) and display the recommendations contained within product recommendations (72). Recommendation display control logic (67) also responds to information from the associated input device (53) regarding (a) the selection of a particular product to identify a selected product (73), and (b) whether the user has chosen a particular product.

A selected product (73) is passed to the detailed display control logic (68). Detailed display control logic (68) uses this information and the display reference data (61) to format the detailed display (44). Detailed display control logic (68) also responds to information from the associated input device (54) if the user has chosen a particular product.

When the user chooses a product using input devices (53) or (54) the control logic modules (67) or (68) will send a reporting signal reporting the chosen product (82) or (83) to the remote server (10) via the communications medium (20) indicating that a choice has been made.

Under certain conditions the preference control logic (65) will also send a reporting signal (81) to the remote server (10) via the communications medium (20) indicating the preferences entered by the user. This can occur, for example, when the user chooses a particular product, but may also occur when a user requests more information on a particular product to be displayed on the detailed display (44). The reported preference information may subsequently be used for market research purposes.

The system of the present invention can allow the names, and other textual descriptions such as price, describing the recommended products to be displayed very quickly. It may be necessary for pictures of the recommended products to be requested from the remote server and displayed when they become available.

The display logic can present more detail about the indicated product on the display of the interaction device while the display also shows slider settings and the synopsis of recommended products. The user may so indicate simply by pointing, or hovering, the pointing device over the portion of the display where a synopsis of one recommended product is shown.

A limited number of leading recommendations may be displayed (typically three, as experience shows that a user can make a detailed comparison between three options). This aspect results in two advantages. Firstly, the user can examine detailed information about each option and re-examine it without apparent delay. This eases the task of making comparisons. Secondly, it is better to display several recommendations rather than a single recommendation as most users obtain satisfaction or enjoyment from a decision making process. If only one recommendation were made then this would deprive the user of the satisfaction or enjoyment that would have been obtained from a decision making process.

The user may request more information about a recommended product simply by pointing, or hovering, the pointing device over the portion of the display where a synopsis of the recommended product is shown. This allows the display to be updated rapidly when the user traverses the pointing device over a succession of synopses of recommended products, and the rapid update also eases the comparison of similar products.

The invention claimed is:

1. Apparatus for aiding the decision-making process of a user selecting from a plurality of products/services, the apparatus comprising:
    a memory storing data defining a plurality of products/services a user is able to select, said data comprising for each respective product/service:
    data defining a graphical representation of said respective product/service;
    data defining a number of criteria defining said respective product/service; and
    data defining a user interface display providing further information on said respective product/service;
    a user interface display comprising a first and a second display portion; and
    recommendation logic responsive to user input of plural selection criteria to apply a matching algorithm to calculate, for each one of a plurality of respective products/services for which data is stored in said memory, a respective score for ranking each respective product/service according to the matching of the data defining the criteria defining the respective product/service and the input user plural selection criteria and to select a predetermined number of graphical representations for inclusion in said second display portion of said user interface display wherein said selected graphical representations comprise graphical representations of products/services associated with scores corresponding to the leading ranked matches between said input plural selection criteria and the data defining the criteria defining said respective products/services, the graphical representations displayed in said second display portion being selectable by a user, said user interface display being responsive to user selection of a graphical representation of a product/service from said second display portion to generate a user interface display providing further information on said selected product/service utilizing data stored in said memory.

2. Apparatus in accordance with claim 1 wherein said data defining graphical representations of a product/service comprise data identifying a name or other textual description of said product/service or a picture of said product/service.

3. Apparatus in accordance with claim 1 wherein said user interface display is responsive to user input of selection criteria to generate a user interface display wherein indications of said input user selection criteria comprising representations of slider settings identifying said user selection criteria are displayed in said first display portion.

4. Apparatus in accordance with claim 1 wherein said user interface display is responsive to user selection of a graphical representation of a product/service from said second display portion to generate a user interface display providing further information on said selected product/service in a third portion of a display at the same time as the display of said first and second display portions.

5. Apparatus in accordance with claim 1 wherein said recommendation logic is operable to order the graphical representations of said products/services displayed in said second display portion of said user display on the basis of said ranking.

6. A computer network comprising:
a user terminal;
a server storing:
program logic for generating user interface displays on a user terminal;
definition data defining a plurality of products/services a user is able to select, said data comprising for each respective product/service:
data defining a graphical representation of said respective product/service;
data defining a number of criteria defining said respective product/service; and
data defining a user interface display providing further information on said respective product/service; and
recommendation logic responsive to receipt of data identifying user input of selection criteria to apply a matching algorithm to calculate, for each one of a plurality of products/services for which definition data is stored a respective score for ranking each respective product/service according to the matching of the data defining the criteria defining the respective product/service and the user input plural selection criteria and to select a predetermined number of graphical representations associated with scores corresponding to the leading ranked matches between said input plural selection criteria and the data defining the criteria defining said respective products/services for inclusion in a generated user interface display; and
a communications medium operable to transmit program logic, recommendation logic and definition data between said server and said user terminal, wherein said user terminal is operable to download program logic, recommendation logic and definition data from said server via said communications medium, said program logic being such cause said user terminal to generate a user interface display comprising a first and a second display portion, said user interface display being responsive to user input of selection criteria to cause indications of said input user selection criteria to be displayed in said first display portion and the predetermined number of graphical representations selected by said recommendation logic as associated with scores indicative of the leading ranked matches between the input plural selection criteria and data defining said respective products/services to be displayed in said second display portion, wherein said graphical representations in said second portion are selectable by a user and said user interface display is responsive to user selection of a graphical representation of a product/service from said second display portion to generate a user interface display providing further information on said selected product/service.

7. A computer network in accordance with claim 6 wherein said user terminal is responsive to user selection of a graphical representation of a product/service from said second display portion to request further information for a selected product/service from said server and responsive to receipt of said further information to utilize said further information to generate a display comprising said user interface display providing further information on said selected product/service.

8. Apparatus for aiding the decision-making process of a user selecting from a plurality of products/services, the apparatus comprising:
a memory storing data defining a plurality of products/services a user is able to select, said data comprising for each respective product/service:
data defining a graphical representation of said respective product/service;
data defining a number of criteria defining said respective product/service; and
data defining a user interface display providing further information on said respective product/service;
a user interface display comprising a first and a second display portion; and
recommendation logic responsive to user input of plural selection criteria to apply a scoring algorithm to calculate, for each of a plurality of respective products/services for which data is stored in said memory, a respective score for ranking each respective product/service and to select a predetermined number of graphical representations for inclusion in said second portion of generated display wherein said selected graphical representations comprise graphical representations of products/services associated with scores corresponding to the leading ranked products/services, the graphical representations displayed in said second display portion being selectable by a user, said user interface display being responsive to user selection of the graphical representation of a product/service from the second display portion to generate a user interface display providing further information on said selected product/service utilizing data stored in said memory;
wherein said scoring algorithm is defined by the following formula:

$$S_p = f(S_{i,p}, I_i); i \in \{1 \ldots N\}; p \in \{1 \ldots Q\},$$

wherein:
$S_p$ represents the overall score for a particular product/service p;
$f(\ldots)$ represents "a function of";
$S_{i,p}$, represents the individual score for criterion i of product/service p;
$I_i$ represents the importance of feature i to a user;
N represents the number of possible selection criteria; and
Q represents the number of products/services for which data is stored in said memory.

9. A computer network comprising:
a user terminal;
a server storing:
program logic for generating user interface displays on a user terminal; and
definition data defining a plurality of products/services a user is able to select, said data comprising for each respective product/service:
data defining a graphical representation of said respective product/service;
data defining a number of criteria defining said respective product/service; and
data defining a user interface display providing further information on said respective product/service;
recommendation logic responsive to receipt of data identifying user input of selection criteria to apply a scoring algorithm to calculate, for each one of a plurality of products/services for which definition data is stored a respective score for ranking each respective product/service and to select a predetermined number of graphical representations associated with scores corresponding to the leading ranked products/services for inclusion in a generated user interface display; and
a communications medium operable to transmit program logic, recommendation logic and definition data between said server and said user terminal, wherein said user terminal is operable to download program logic, recommendation logic and definition data from said server via said communications medium, said program logic being such cause said user terminal to generate a user interface display comprising a first and a second display portion, said user interface display being responsive to user input of selection criteria to cause indications of said input user selection criteria to be displayed in said first display portion and the predetermined number of graphical representations selected by said recommendation logic as associated with scores indicative of the leading ranked products/services to be displayed in said second display portion, wherein said graphical representations in said second portion are selectable by a user and said user interface display is responsive to user selection of a graphical representation of a product/service from said second display portion to generate a user interface display providing further information on said selected product/service;

wherein said scoring algorithm is defined by the following formula:

$$S_p = f(S_{i,p}, I_i); i \in \{1 \ldots N\}; p \in \{1 \ldots Q\},$$

wherein:

$S_p$ represents the overall score for a particular product/service p;

f( ... ) represents "a function of";

$S_{i,p}$ represents the individual score for criterion i of product/service p;

$I_i$ represents the importance of feature i to a user;

N represents the number of possible selection criteria; and

Q represents the number of products/services for which data is stored.

\* \* \* \* \*